United States Patent [19]

Bertelsen et al.

[11] Patent Number: 4,839,037
[45] Date of Patent: Jun. 13, 1989

[54] TAPERED, SPIRALLY WOUND FILTER CARTRIDGE AND METHOD OF MAKING SAME

[75] Inventors: Robert A. Bertelsen, St. Louis Park; David J. Paulson, Minnetonka, both of Minn.

[73] Assignee: Osmonics, Inc., Minnetonka, Minn.

[21] Appl. No.: 37,113

[22] Filed: Apr. 6, 1987

Related U.S. Application Data

[63] Continuation-in-part of Ser. No. 23,192, Mar. 9, 1987, abandoned.

[51] Int. Cl.⁴ .................. B01D 27/04; B01D 29/06
[52] U.S. Cl. .................... 210/97; 210/232; 210/321.83; 210/457; 210/497.1; 55/520; 55/DIG. 5; 156/187; 156/192; 156/193; 156/258; 156/291; 156/304.2; 156/304.5
[58] Field of Search .............. 210/232, 440, 443, 457, 210/493.4, 494.1, 497.3, 321.83, 321.87, 497.1, 97, 136; 55/520, DIG. 5; 29/163.5 R, 163.5 F; 156/187, 192, 193, 258, 291, 304.2, 304.5

[56] References Cited

U.S. PATENT DOCUMENTS

| | | | |
|---|---|---|---|
| Re. 20,494 | 9/1937 | Burhans | 210/497.3 |
| 1,669,461 | 5/1928 | Gamble | 210/493.4 |
| 2,726,185 | 12/1955 | Howald | 154/91 |
| 2,995,254 | 8/1961 | Bennett | 210/494.1 |
| 3,050,193 | 8/1962 | Gillick, Jr. et al. | 210/494.1 |
| 3,063,888 | 11/1962 | Howard et al. | 210/494.1 |
| 3,317,045 | 5/1967 | Dummler | 210/130 |
| 4,187,136 | 2/1980 | Nostrand | 210/494.1 |
| 4,548,714 | 10/1985 | Kirwan, Jr. et al. | 210/232 |
| 4,609,466 | 9/1986 | McCausland | 210/244 |

FOREIGN PATENT DOCUMENTS

| | | | |
|---|---|---|---|
| 484056 | 4/1938 | United Kingdom | 210/494.1 |
| 635557 | 4/1950 | United Kingdom | 210/494.1 |
| 1358975 | 7/1974 | United Kingdom | |
| 1476731 | 6/1977 | United Kingdom | |

*Primary Examiner*—Richard V. Fisher
*Assistant Examiner*—Wanda L. Millard
*Attorney, Agent, or Firm*—Dorsey & Whitney

[57] ABSTRACT

A spirally wound filter cartridge and a method of making the same in which the cartridge includes an elongated, centrally disposed tube or mandrel, and a sheet of filtration material spirally wound around the tube such that the cartridge has a tapered configuration with a first end of the cartridge being greater in diameter than the second end. The present invention also relates to a filtration device having a filter cartridge housing adapted to receive the above mentioned tapered filter cartridge.

19 Claims, 3 Drawing Sheets

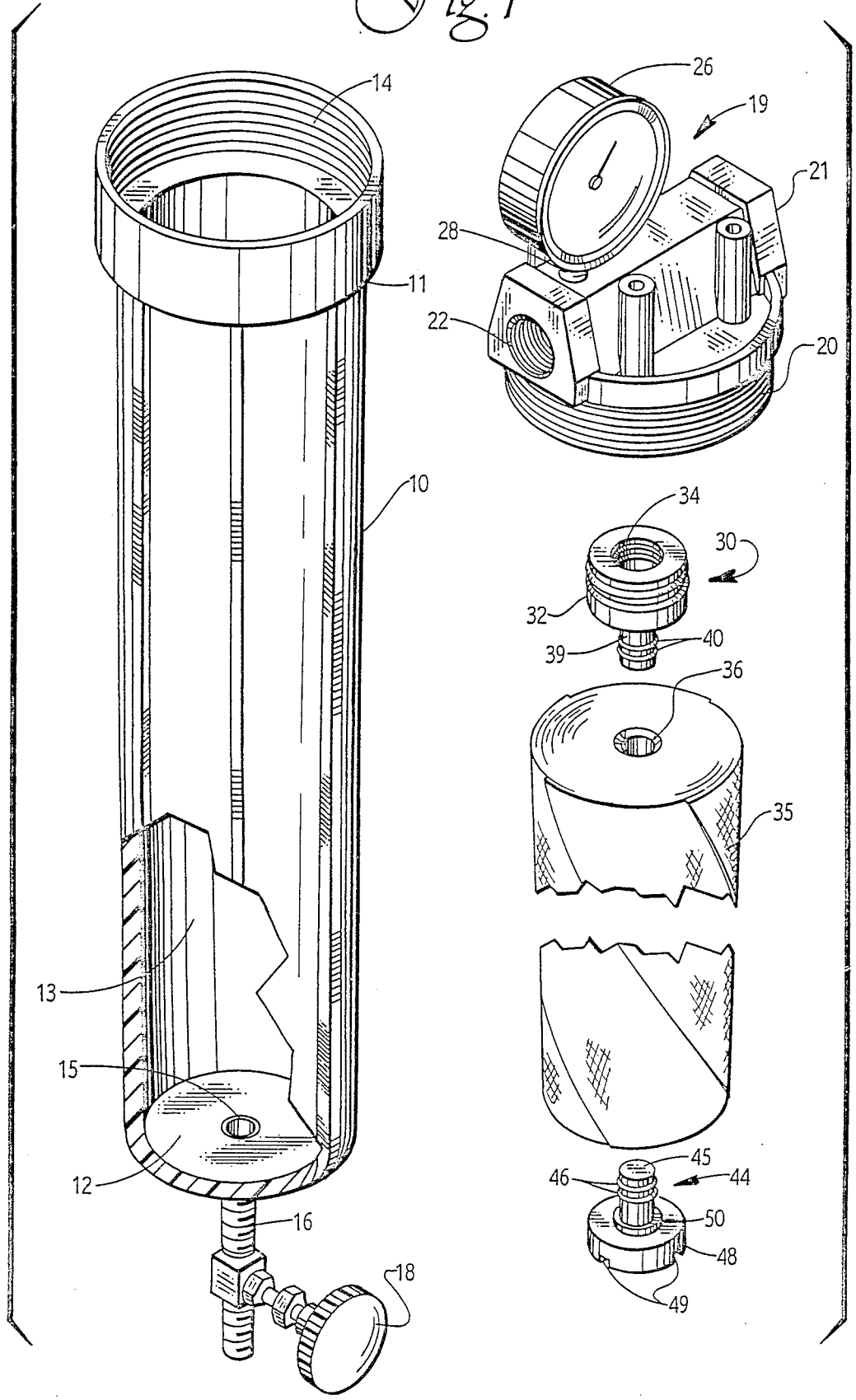

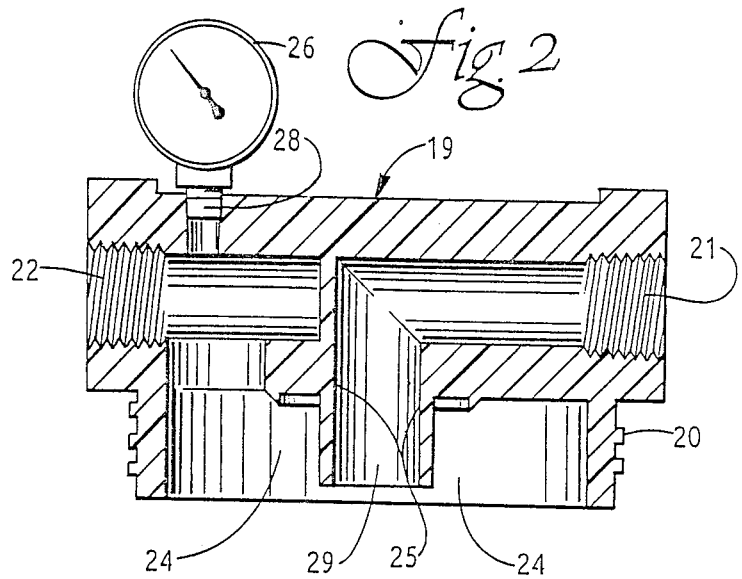
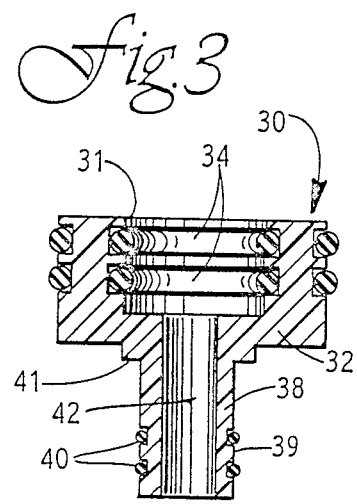
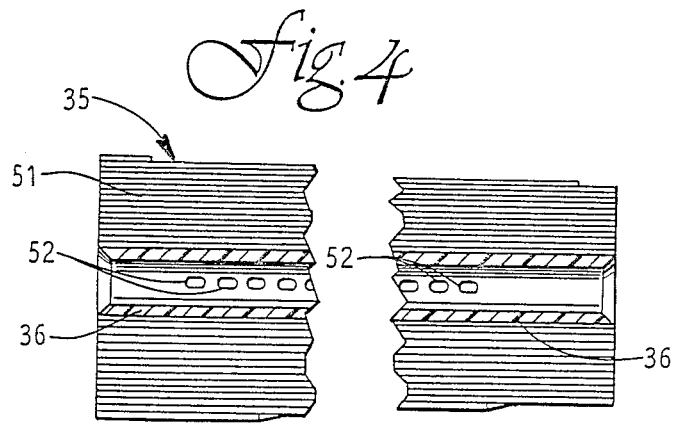
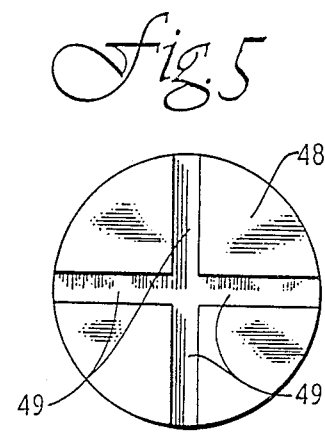
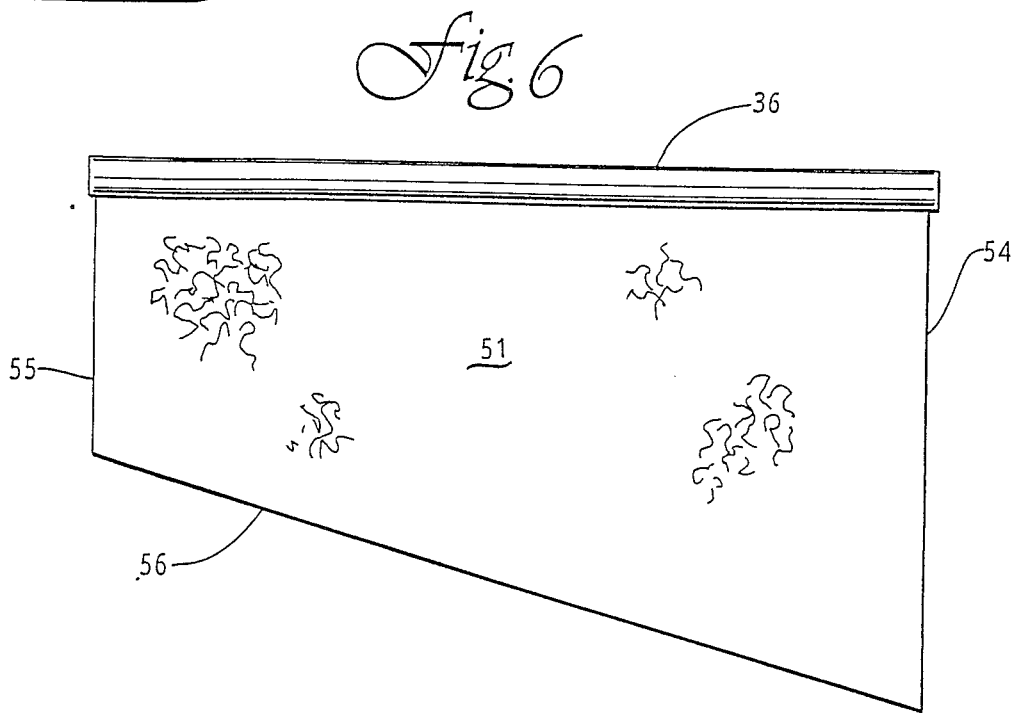

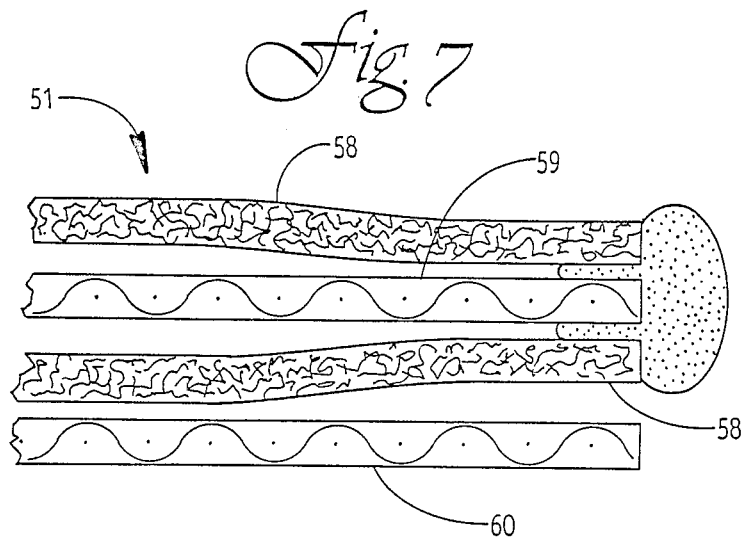
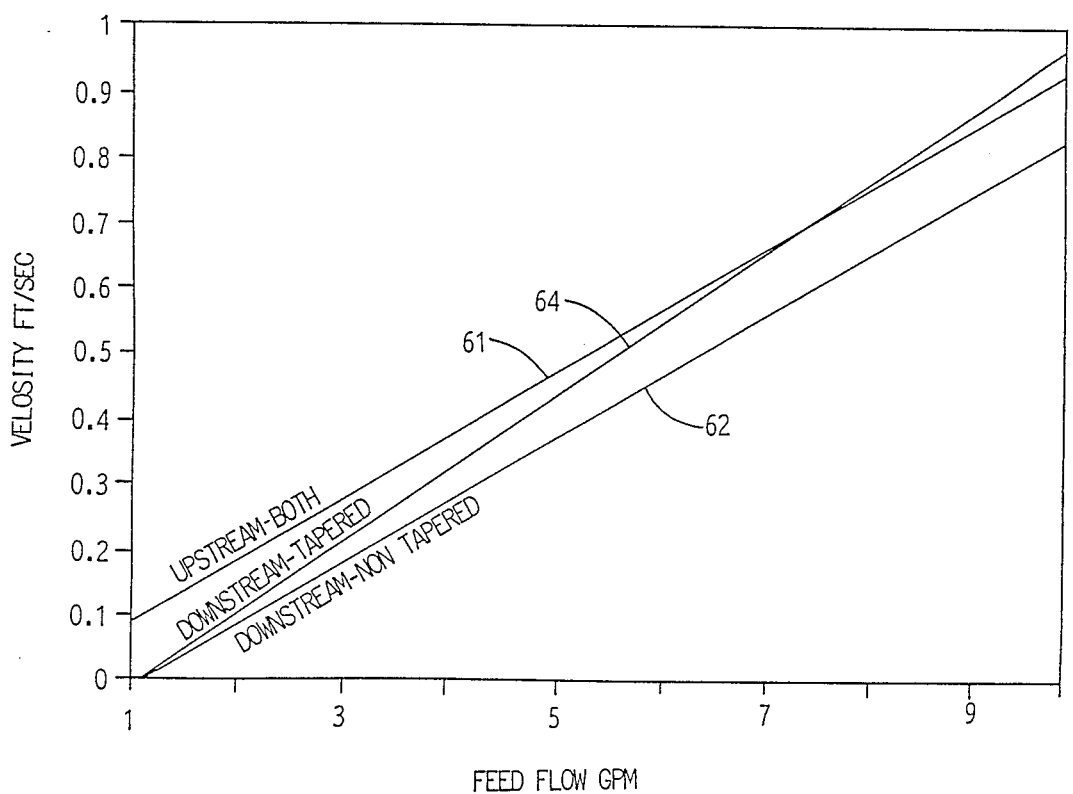

TAPERED, SPIRALLY WOUND FILTER CARTRIDGE AND METHOD OF MAKING SAME

This application is a continuation-in-part of patent application Ser. No. 07/023,192, filed Mar. 9, 1987, now abandoned.

BACKGROUND OF THE INVENTION

The present invention relates generally to a spirally wound membrane filter element or cartridge for use in a standard cartridge filter housing together with a method for making such a cartridge, and more particularly, to a spirally wound cartridge, and method for making the same, in which the cartridge is tapered to provide a full fit with respect to the filter housing and to maintain relatively constant feed velocity over the membrane surface despite the passage of a portion of the feed through the membrane into the permeate tube.

Standard cartridge filter housings presently exist for receiving a filter cartridge. These standard cartridge filter housings are molded with a substantial draft angle or taper inside the sump portion of the housing to facilitate release of that part from the mold and, in some cases, to add strength to the sump. Such a filter housing comprises an elongated tapered sump portion having a closed bottom. If the housing is intended for use with a crossflow membrane filter element, it is also provided with a concentrate valve or orifice connected to the bottom. The housing also includes a housing cap through which the feed water or solution is introduced into the housing for exposure to the filter element and a permeate outlet for removing permeate or filtrate from the system.

Current technology with respect to the filter cartridges utilized in these cartridge housings ranges from standard pleated filter cartridges which utilize conventional "dead end" filtration technology and standard spirally wound membrane elements which utilize "cross flow" filtration technology. In "dead end" filtration technology there is no flow of feed water or solution relative to the membrane other than what passes through the filter media, while in "cross flow" filtration technology, the feed water, in addition to having a portion pass through the filter media, continually flows across the membrane surface and exits through a concentrate outlet port or valve. For purposes of this application, the term membrane is used to describe the filter material or media, whether it is technically a membrane or not. Conventional spirally wound membrane elements are generally cylindrical in shape and are formed by winding a relatively rectangular sheet of membrane material (together with appropriate spacer and permeate collection materials also relatively rectangular in shape) in a spiral configuration around a centrally disposed permeate tube or mandrel. This generally cylindrical filter cartridge is then disposed within the sump portion of the filter housing. However, because of the tapered configuration of the sump, the top portion of the filter cartridge is spaced inwardly from the interior surface of the upper end of the sump. A brine seal or concentrate seal is then positioned near the top of the filter cartridge between the outer surface of the cartridge and the inner wall of the sump. Such a seal is needed to force the feed solution, which is introduced at the top of the sump, to pass through the cartridge element flow channels defined by the spacer and over the membrane, and not around the outside between the sump wall and the outer surface of the filter cartridge.

While this construction is satisfactory in some applications, the provision of the brine or concentrate seal creates dead flow areas between the sump wall and the outer surface of the filter cartridge which can be havens for bacteria and other contaminants. Further, the above described structure requires the provision of such a brine or concentrate seal to operate sucessfully in the cross flow mode. This adds to the cost of the overall system, adds to the maintenance of it since such seal must be periodically cleaned, and limits its potential use since one more material with potential chemical incompatibility with the fluid is added to the filtration element. Further, existing spiral wound membrane cartridges lack uniform flow velocity over the entire membrane surface because of the fact that a portion of the feed water, during its passage through the membrane cartridge, is removed through the permeate outlet. Thus, during the passage of feed water or solution from one end of the cartridge to the other, the flow rate over the membrane surface decreases. This results in less predictable filter cartridge performance and shorter life of the membrane element due to the greater likelihood of cartridge plugging or blinding.

Accordingly, there is a need in the art for an improved filter cartridge element for use in a standard tapered filter housing, which cartridge overcome the problems and limitations currently existing in the art.

SUMMARY OF THE INVENTION

In contrast to the prior art, the present invention provides an improved filter cartridge for use in a tapered filter housing which utilizes cross flow filtration technology and which also eliminates the need for a brine or concentration seal required in prior art applications. The elimination of the brine or concentrate seal substantially reduces or eliminates possible areas for bacterial growth and other contaminants as indicated above and also reduces the cost of the system and improves and simplifies the maintenance thereof. The filter cartridge of the present invention also totally eliminates the dead areas between the outer surface of the filter cartridge and the inner surface of the sump and thereby increases the possible filter area by more efficiently utilizing the available space in the sump. The improved filter cartridge of the present invention also provides for relatively uniform feed water flow across the membrane surface despite the fact that a portion of the feed water passes through the membrane and exits through the permeate outlet.

More specifically, the present invention provides a spirally wound, tapered filter cartridge which is larger at one end than the other and a method for making the same. In the preferred embodiment and method, the filter cartridge of the present invention is designed so that its outer side wall is tapered at an angle which approximates the taper of the sump portion of the filter housing. Thus, when the filter cartridge is inserted into the housing sump, a full fit relationship is provided between the outer surface of the filter cartridge and the inner surface of the sump. As indicated above, this eliminates the need for the brine or concentrate seal, thereby reducing the cost of the system. Such a design also simplifies the maintenance of the system and substantially reduces the potential dead flow areas and sites for bacteria and other contaminants to collect and grow. Further, the amount of membrane area in such filter cartridge is increased over that of conventional cartridges because of the fact that the filter cartridge of the present invention is designed to completely fill the tapered sump.

Accordingly, it is an object of the present invention to provide an improved cartridge filter for use in a filter housing having a tapered sump and a method for making the same.

Another object of the present invention is to provide an improved, spirally wound filter cartridge which eliminates the need for a brine or concentrate seal when used with a tapered sump and which also provides more uniformity of feed water flow over the entire membrane element.

Another object of the present invention is to provide an improved spirally wound filter cartridge which is tapered along its length so that is larger at its top than its bottom, thus conforming substantially to the inner walls of a tapered sump when inserted therein.

Another object of the present invention is to provide an improved method for making the spirally wound, tapered cartridge as described above.

These and other objects of the present invention will become apparent with reference to the description of the drawings, the description of the preferred embodiment and method and the appended claims.

DESCRIPTION OF THE DRAWINGS

FIG. 1 is a pictorial, exploded view, with portions broken away, of the filter cartridge housing and improved filter cartridge of the present invention.

FIG. 2 is a cross-sectional view of the filter housing end cap of the system of the present invention.

FIG. 3 is a cross-sectional view of the filter cartridge adapter to the end cap for use with the improved filter cartridge of the present invention.

FIG. 4 is a cross-sectional view, with a portion removed, of the filter cartridge of the present invention.

FIG. 5 is a bottom view of a bottom plug element for use with the improved filter cartridge of the present invention.

FIG. 6 is a plan view showing the center permeate tube or mandrel and a sheet of filtration materials or a filtration materials sandwich prior to being formed into the spirally wound, tapered configuration of the present invention.

FIG. 7 is a cross-sectional view of a portion of a filtration materials sandwich showing the membrane, the permeate carrier and the spacer mesh.

FIG. 8 is a graph plotting feed flow (in gallons per minute) against fluid velocity through the cartridge (in feet per second) for both a conventional cylindrical, spirally wound filter cartridge of the prior art and the tapered, spirally wound filter cartridge of the present invention.

DESCRIPTION OF THE PREFERRED EMBODIMENT AND METHOD

Reference is first made to FIG. 1 comprising a pictorial, exploded view of the filter system of the present invention including a filter cartridge housing and a filter cartridge assembly. The filter cartridge housing includes an elongated, tapered sump 10 having a tapered inner wall 13 which is larger in diameter at its top than at its bottom, a bottom wall 12 and an upper connecting flange 11. The connecting flange 11 is integrally joined with the top edge of the wall 13 and is provided with a plurality of internal threads 14 for appropriate connection with an end cap 19. The bottom wall 12 includes a centrally positioned bottom opening 15 in communication with a concentrate outlet conduit 16. The outlet conduit 16 is provided with an appropriate concentrate valve or orifice 18 for controlling the flow of concentrate through the conduit 16 in a manner known in the art. By closing or opening the valve 18, the back pressure and flow rate within the sump 10 can be controlled.

With reference to FIG. 1 and FIG. 2, the end cap 19 is provided with a plurality of external threads 20 at the lower end of the cap 19. The external threads 20 are adapted to be received by the internal threads 14 of the sump 10 when the housing is fully assembled.

As illustrated best in FIG. 2, the end cap 19 is provided at one end with a permeate outlet 21 and at its other end with a feed water or feed solution inlet 22. The feed water inlet 22 is in direct communication with the annular open area 24 above the upper end of the filter cartridge 35 as will be seen in the description below. The permeate outlet 21 is in communication with the generally cylindrical area 29 defined by the annular wall portion 25. When the wall 25 connected with the end cap adapter member 30, the permeate outlet 21 is in communication with the interior of the permeate tube or mandrel 36.

The end cap 19 is provided with a conventional pressure gauge 26 and a conduit 28 connecting the pressure gauge 26 to the feed inlet 22. Thus, the pressure gauge 26 is utilized to visually observe the operating pressure of the system.

The end cap adapter 30 is illustrated best in FIGS. 1 and 3. As illustrated, the cartridge end cap adapter 30 includes an upper portion 32 having a cylindrical bore 31 adapted to slide over the outer surface of the cylindrical wall 25 of the end cap 19. A pair of O-rings 34 are disposed in appropriate grooves within the bore 31 for sealing engagement with the outer surface of the wall 25. A lower portion 38 of the end cap adapter 30 defines a permeate bore 42 and includes an outer surface 39 which is designed to fit within the interior of the upper end of the permeate tube 36 (FIG. 1). A pair of O-rings 40 are disposed in appropriate grooves in the outer surface 39 of the portion 38 for sealing engagement with the inner surface of the mandrel 36. A lower end of the portion 32 is provided with a shoulder 41 which, when the system is fully assembled, engages the top edge of the permeate mandrel 36. When the system is fully assembled, the permeate outlet 21 is joined, in sealed communication, with the interior of the permeate 36.

An end plug 44 illustrated best in FIGS. 1 and 5 is adapted for insertion into the end of the tube 36 opposite to the end cap adapter 30. As illustrated, the end plug 44 includes a solid plug portion 45 integrally formed with a circular foot or base portion 48. A shoulder 50 is positioned between the lower end of the portion 45 and the base 48 for supporting engagement with the end of the tube 36. When fully assembled, the portion 45 is inserted into the end of the tube 36 and a pair of O-rings 46, disposed in appropriate grooves in the outer surface of the portion 45, provide sealing engagement between the member 45 and the interior surface of the mandrel 36.

The bottom surface of the base 48 is provided with a plurality of recessed portions or channels 49. These channels 49 allow for the concentrate to flow from the bottom end of the sump 10 into and through the outlet opening 15. In the present embodiment, the concentrate comprises that portion of the feed which has passed through the cartridge and across the membrane and exits through the end opposite the end cap.

Reference is next made to FIGS. 1, 4 and 6 illustrating various views of the tapered filter cartridge of the present invention. Specifically, FIG. 1 shows the filter cartridge 35 in pictorial form, FIG. 4 is a cross-sectional view of the filter cartridge with a portion removed and FIG. 6 is a view of the filter cartridge of the present invention prior to it being spirally wound.

In the preferred embodiment of the present invention, the filter cartridge 35 is spirally wound onto a center permeate tube and is tapered so that it is larger at its top than at its bottom. This is illustrated best in FIG. 4 in which it shows the angle of the taper 43 to be about 1°. In the preferred embodiment, this angle of taper 43 is intended to conform substantially to the angle of taper of the sump 10 and inner sump wall 13 (FIG. 1)

The construction of the cartridge filter 35 is similar to conventional spirally wound cartridge filters in that it includes a center permeate tube or mandrel 36 and a plurality of layers 51 of a filtration materials sandwich, but is different in that the assembled cartridge 35 is tapered in the aforementioned manner. In the preferred embodiment, as illustrated best in FIG. 7, each of the spirally wound layers 51 of the cartridge 35 includes a pair of membrane elements 58, a permeate collection material 59 disposed therebetween, and a mesh spacer 60, all of which are well known and conventional in the art. In the preferred embodiment, the angle between the edges of 54 and 56 is between about 60° and 75° to produce the preferred taper in the resulting cartridge.

The method of assembling or manufacturing the tapered cartridge 35 of the present invention is illustrated best in FIG. 6. As shown, the permeate tube or mandrel 36 is connected with an edge of a sheet of a filtration materials 51 comprising similarly configured sheets of membrane 58, mesh spacer 60 and permeate collection material 59 as shown in FIG. 7. The sheet of filtration materials 51 is defined by a tube connection edge which is secured to a portion of the elongated permeate tube or mandrel 36 in a direction generally parallel to its axis, a pair of side edges 54 and 55 and a biased or beveled edge 56. It should be noted that the side edge 55 is shorter than the end edge 54. This results in the outer edge 56 being angled or tapered as shown in FIG. 6. It should also be noted that the permeate tube 36 includes a plurality of openings 52 (FIG. 4) which, when the filter material 51 is secured to the tube 36, are positioned between the pair of membrane sheets 58 in a manner known in the art.

In the preferred embodiment, the angle between the edges 54 and 56 is between about 60° and 75° to produce the preferred taper in the resulting cartridge.

The edges 54, 55 and 56 of corresponding pairs of membrane sheets 58 are then glued or otherwise secured to one another, with the permeate collection material 59 disposed therebetween in the manner illustrated in FIG. 7. When this is done, the sheet of filtration materials 51 is spirally wound around the tube or mandrel 36. When this is completed, it is temporarily taped until the glue applied to the edges has cured, at which time the tape is removed. The resulting cartridge is a spirally wound cartridge having a tapered configuration as shown in FIGS. 1 and 4. Such a cartridge, when inserted into the sump 10, fits into the configuration of the interior wall 13 to substantially eliminate any dead space areas between the outer surface of the cartridge 35 and the wall 13.

An alternative method of making the cartridge is to start out with a generally rectangular sheet of filtration material, glue the edges 54 and 55 and begin winding it onto the tube 36 until a portion of the sheet is spirally wound onto the tube 36. Then, after determining the exact size of cartridge and taper desired, cut the end of the sheet 51 so that the position and slope of the tapered edge 56 is exactly as desired. The edge 56 is then glued and the winding is completed.

As can be seen, the extend of the taper of the cartridge 35, regardless of the construction method utilized, will be determined by the angle of the beveled edge 56. Similarly, the size of the top and bottom ends of the cartridge 35 will be determined by the length of the edges 54 and 55.

Although it is contemplated that cartridges having a variety of tapers can be constructed, the specific taper of a particular cartridge 35 will be intended to conform closely with the taper of the interior wall 13 of the particular sump 10 with which it is intended to be used. In the preferred embodiment, it is contemplated that the taper of the sump wall is between about 0.3° and 5°. Thus, the preferred taper of the cartridge is greater than 0.3° and preferably between about 0.3° and 5° with range within this preferred range of 0.5°–1°.

It should also be noted, as described above in connection with the summary of the invention, that the tapered cartridge 35 of the present invention provides for more uniformity of flow over the membrane surface during operation. In a crossflow mode, feed water or solution is introduced at the top end of the cartridge 35 as shown in FIG. 1 and is caused to flow through the spacer element 60 (FIG. 7) toward the lower end of the cartridge 35. During this flow, the feed is exposed to the surface of the membranes 58 under pressure and a portion is caused to pass through the membranes 58 and into the area therebetween defined by the permeate collection material 59 as a result of pressure in the system. Thus, during flow of the feed from the top to the bottom of the cartridge 35, a certain portion of the feed will pass through the membrane material 58, into the center of the permeate tube 36 through the openings 52 and out through the permeate outlet 21. In a typical filtration system the amount of feed which passes through the membrane, normally referred to as the recovery, is between about 8% and 20% and preferably about 15%. However, in some applications, the recovery can be as high as 50%–75% or more. For purposes of the present application, the recovery equals a fraction whose numerator is the feed rate minus the permeate rate and whose denominator is the feed rate and which fraction is multiplied by 100%.

When a conventional, cylindrically shaped filter cartridge is used in a filter housing of the type illustrated in FIG. 1, the membrane area and feed channel volume to which the feed is exposed is constant from the top of the cartridge to the bottom. Thus, because a portion of the feed passes through the membrane and out through the permeate tube 36 during operation, the velocity of the feed decreases as it flows through the cartridge. With the tapered cartridge of the present invention, however, the surface area of membrane exposed to the feed decreases from the top to the bottom of the cartridge 35. This will tend to maintain the velocity of the feed at a more uniform level from one end of the cartridge to the other despite the loss of some of the feed through the permeate tube 36.

FIG. 8 is a graph plotting velocity of feed versus feed flow in gallons per minute assuming a permeate flow of one gallon per minute. As shown, for a conventional, cylindrical cartridge, difference in velocity is maintained between the upstream end (illustrated by reference numeral 61) and the downstream end (illustrated by numeral 62) regardless of the feed flow through the system. On the other hand, the graph in FIG. 8 shows that for certain feed flows, the difference between the upstream velocity and the downstream velocity for a tapered cartridge of the present invention is nearly the same. In fact, as illustrated on the graph of FIG. 8, a feed flow of between 7 and 7.5 gallons per minute, with a permeate flow of one gallon per minute, will result in substantially uniform velocity of the feed over the entire length of the cartridge. This is a significant advantage of the present cartridge design since the cleaning action of the feed velocity on the membrane surface is important to attaining economcial filter life, so the tapered cartridge design optimizes the life of the cartridge, provides for a more predictable cartridge performance and results in a higher membrane flux.

Although the description of the preferred embodiment and method has been quite specific, it is contemplated that various modifications could be made without deviating from the spirit of the present invention. Accordingly, it is intended that the scope of the present invention be dictated by the appended claims rather than by the description of the preferred embodiment.

We claim:

1. A spirally wound, cross flow filter cartridge comprising:
    an elongated, centrally disposed permeate tube having a first set of openings;
    a sheet of filtration materials spirally wound around said permeate tube, said sheet of filtration materials comprising a pair of membrane elements and a permeate carrier disposed therebetween, said pair of membrane elements having corresponding edge portions sealed to said permeate tube with said first set of openings disposed therebetween and the remaining edge portions sealed to one another;
    said cartridge having first and second transverse ends generally circular in configuration and an outer surface portion joining said ends in which said first end is greater in diameter than said second end and said outer surface is tapered from said first end to said second end, said first end defining an inlet end which is uncapped and capable of receiving fluid flow and said second end defining an outlet end which is uncapped and capable of providing fluid flow whereby fluid to be filtered enters said inlet end and flows longitudinally in a direction generally parallel to said permeate tube toward said outlet end with at least a portion of said fluid passing through one of said membrane elements and into said permeate tube through said first set of openings.

2. The cartridge of claim 1 wherein said outer surface is tapered between about 0.3 and 5 degrees relative to the longitudinal axis of said permeate tube.

3. The cartridge of claim 2 wherein said outer surface is tapered between about 0.5 and 1 degrees relative to the longitudinal axis of said permeate tube.

4. The filter cartridge of claim 1 wherein said sheet of filtration materials includes a spacer sheet disposed between adjacent membrane elements, said spacer sheet being in communication with said inlet and outlet ends and defining a flow path for fluid between said inlet and outlet ends.

5. A cross-flow filtration device comprising:
    a filter cartridge housing having an elongated sump having an open top, a closed bottom and a tapered side wall extending between said top and bottom, said top being larger than said bottom and said tapered side wall having a greater diametrical dimension at its top than at its bottom;
    an end cap connectable with said open top; a spirally wound, tapered filter cartridge disposed within said sump and comprising:
    an elongated, centrally disposed permeate tube having a first set of openings;
    a sheet of filtration materials spirally wound around said permeate tube, said sheet of filtration materials comprising a pair of membrane elements and a permeate carrier disposed therebetween, said pair of membrane elements having corresponding edge portions sealed to said permeate tube with said first set of openings disposed therebetween and the remaining edge portions sealed to one another;
    said cartridge having first and second transverse ends generally circular in configuration and an outer surface portion joining said ends in which said first end is greater in diameter than said second end and said outer surface is tapered from said first end to said second end, said first end defining an inlet end which is uncapped and capable of receiving fluid flow and said second end defining an outlet end which is uncapped and capable of providing fluid flow whereby fluid to be filtered enters said inlet end and flows longitudinally in a direction generally parallel to said permeate tube toward said outlet end with at least a portion of said fluid passing through one of said membrane elements and into said permeate tube through said first set of openings;
    a permeate outlet in said end cap;
    means for connecting said permeate outlet with said permeate tube;
    a feed inlet in said end cap; and
    means for connecting said feed inlet with said first end of said filter cartridge.

6. The filtration device of claim 5 wherein the taper of said tapered outer surface of said filter cartridge conforms substantially to the taper of said tapered side wall of said sump.

7. The filtration device of claim 6 wherein said tapered outer surface of said filter cartridge is in substantial engagement with and adjacent to said tapered side wall of said sump throughout the entire length of said filter cartridge.

8. The filtration device of claim 7 in which there is an absence of any seal member between said outer surface of said filter cartridge and the tapered side wall of said sump other than as a result of said engagement between said outer surface and said side wall.

9. The filtration device of claim 5 including a concentrate opening in said bottom.

10. The filtration device of claim 9 including a concentrate flow control device.

11. The filtration device of claim 5 wherein said outer surface is tapered between about 0.3 and 5 degrees relative to the longitudinal axis of said permeate tube.

12. The filtration device of claim 11 wherein said outer surface is tapered between about 0.5 and 1 degrees relative to the longitudinal axis of said permeate tube.

13. The filtration device of claim 5 wherein said sheet of filtration materials includes a spacer sheet disposed between adjacent membrane elements, said spacer sheet being in communication with said inlet and outlet ends and defining a flow path for fluid between said inlet and outlet ends.

14. A method of making a cross flow, tapered filter cartridge having a pair of transverse, generally circular first and second ends which are uncapped and capable of receiving and providing fluid flow, respectively comprising the steps of:

laying up a sheet of filtration material having a permeate tube connecting edge, first and second side edges each having a first end adjacent to a respective end of said permeate tube connecting edge and extending therefrom at substantially right angles and a beveled edge generally opposite to said permeate tube connecting edge and adjacent to a second end of each of said side edges, said first side edge being longer than said second edge, said sheet of filtration material comprising a pair of similarly configured membrane material sheets and a permeate carrier sheet disposed therebetween;

securing said permeate tube connecting edge to a permeate tube having a first set of openings with the permeate tube connecting edges of said pair of membrane sheets being secured to said tube on opposite sides of said first set of openings;

gluing said pair of membrane material sheets together, with said permeate carrier sheet disposed therebetween, along said side edges and said beveled edge; and spirally winding said filtration material around said permeate tube.

15. The method of claim 14 wherein the angle between said first side edge and said beveled edge is between about 60° and 75°.

16. The method of claim 14 wherein the step of laying up a sheet of filtration material includes laying up a sheet of filtration material comprising a similarly configured spacer sheet disposed between adjacent membrane material sheets.

17. A method of making a cross flow, tapered filter cartridge having a pair of transverse, generally circular first and second ends which are uncapped and capable of receiving and providing fluid flow, respectively comprising the steps of:

laying up a sheet of filtration material having a permeate tube connecting edge, first and second side edges each having a first end adjacent to a respective end of said permeate tube connecting edge and extending therefrom at substantially right angles and an edge generally opposite to said permeate tube connecting edge and adjacent to a second end of each of said side edges, said sheet of filtration material comprising a pair of similarly configured membrane material sheets and a permeate carrier sheet disposed therebetween;

securing said permeate tube connecting edge to a permeate tube;

gluing said pair of membrane material sheets together with said permeate carrier sheet disposed therebetween, along said side edges;

partially spirally winding said filtration material around said permeate tube;

cutting said sheet of filtration material at a bevel relative to the longitudinal axis of said tube;

gluing said pair of membrane material sheets together along said beveled edge; and completing the spiral winding of said filtration material around said permeate tube.

18. The method of claim 17 including cutting said sheet of filtration material at a bevel relative to the longitudinal axis of said tube so that said bevel creates an angle of between about 60° and 75° relative to said first side edge.

19. The method of claim 17 wherein the step of laying up a sheet of filtration material includes laying up a sheet of filtration material comprising a similarly configured spacer sheet disposed between adjacent membrane material sheets.

* * * * *